US010823820B2

United States Patent
Yamada et al.

(10) Patent No.: US 10,823,820 B2
(45) Date of Patent: Nov. 3, 2020

(54) RADAR AND BEAM CONTROL METHOD

(71) Applicant: Mitsubishi Electric Corporation, Tokyo (JP)

(72) Inventors: Tetsutaro Yamada, Tokyo (JP); Tetsuji Harada, Tokyo (JP); Yasushi Obata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 280 days.

(21) Appl. No.: 16/060,108

(22) PCT Filed: Mar. 4, 2016

(86) PCT No.: PCT/JP2016/056802
§ 371 (c)(1),
(2) Date: Jun. 7, 2018

(87) PCT Pub. No.: WO2017/149761
PCT Pub. Date: Sep. 8, 2017

(65) Prior Publication Data
US 2018/0372838 A1 Dec. 27, 2018

(51) Int. Cl.
*G01S 7/282* (2006.01)
*G01S 13/86* (2006.01)
(Continued)

(52) U.S. Cl.
CPC ............... *G01S 7/282* (2013.01); *G01S 7/02* (2013.01); *G01S 7/04* (2013.01); *G01S 7/295* (2013.01);
(Continued)

(58) Field of Classification Search
CPC . G01S 7/282; G01S 13/86; G01S 7/02; G01S 7/4026; G01S 7/04; G01S 7/295; G01S 7/34
(Continued)

(56) References Cited

U.S. PATENT DOCUMENTS

| | | | | |
|---|---|---|---|---|
| 6,246,357 | B1* | 6/2001 | Uehara | G01S 13/345 |
| | | | | 342/133 |
| 2010/0219953 | A1* | 9/2010 | Bloy | G01S 13/872 |
| | | | | 340/572.1 |
| 2015/0285906 | A1* | 10/2015 | Hooper | G01S 7/412 |
| | | | | 342/21 |

FOREIGN PATENT DOCUMENTS

| | | |
|---|---|---|
| JP | 02-168186 A | 6/1990 |
| JP | 05-209952 A | 8/1993 |

(Continued)

OTHER PUBLICATIONS

Extended European Search Report for corresponding European Application No. 16892601.2, dated Jan. 4, 2019.
(Continued)

*Primary Examiner* — Bo Fan
(74) *Attorney, Agent, or Firm* — Birch, Stewart, Kolasch & Birch, LLP

(57) ABSTRACT

An information acquiring unit for acquiring direction information indicating the direction in which a target is to be searched for and observation accuracy information indicating the observation accuracy in the direction, and a beam arrangement determining unit for determining an arrangement of beams to be emitted by an antenna from the direction information and the observation accuracy information acquired by the information acquiring unit are provided, and a beam controlling unit controls the directions of the beams to be emitted by the antenna in accordance with the arrangement of beams determined by the beam arrangement determining unit.

6 Claims, 6 Drawing Sheets

(51) Int. Cl.
  *G01S 7/02*    (2006.01)
  *G01S 7/40*    (2006.01)
  *G01S 7/04*    (2006.01)
  *G01S 7/295*   (2006.01)
  *G01S 7/34*    (2006.01)
  *G01S 13/10*   (2006.01)
  *G01S 13/68*   (2006.01)
  *H01Q 3/38*    (2006.01)
  *G01S 13/66*   (2006.01)
  *G01S 13/02*   (2006.01)

(52) U.S. Cl.
  CPC .............. *G01S 7/34* (2013.01); *G01S 7/4026* (2013.01); *G01S 13/106* (2013.01); *G01S 13/68* (2013.01); *G01S 13/86* (2013.01); *H01Q 3/38* (2013.01); *G01S 13/66* (2013.01); *G01S 2013/0245* (2013.01)

(58) Field of Classification Search
  USPC ....................................... 342/81, 133, 54, 62
  See application file for complete search history.

(56) References Cited

FOREIGN PATENT DOCUMENTS

JP    2000-171551 A    6/2000
JP    2011-095038 A    5/2011

OTHER PUBLICATIONS

International Search Report for PCT/JP2016/056802 (PCT/ISA/210) dated Jun. 7, 2016.

Matsuda et al., "A Study on Target Detection and Beam Arrangement Methods for a Multi-Beam Radar", IEICE B, vol. J87-B, No. 8, Aug. 2004, pp. 1094-1105.

Office Action dated Feb. 7, 2017 for Japanese Patent Application No. 2016-549412.

Office Action dated Oct. 4, 2016 for Japanese Patent Application No. 2016-549412.

* cited by examiner

RADAR AND BEAM CONTROL METHOD

TECHNICAL FIELD

The present disclosure relates to a radar for controlling the directions of beams to be emitted from an antenna, and a beam control method for controlling the directions of beams to be emitted from an antenna of a radar.

BACKGROUND ART

Some radars emit beams of electromagnetic waves into space in which one or more targets are present, receive the electromagnetic waves that are reflected from the targets and return to the radars, and detect the targets from received signals of the returned electromagnetic waves.

Examples of such radars include phased array radars. In a typical phased array radar, an array antenna in which a plurality of antenna elements arranged on a plane is mounted, and the beams transmitted/received in the array antenna are electronically scanned.

In phased array radars, the direction in which the beams are directed and how many beams are directed in that direction are of great significance in improving the target detection probability.

To increase search data rate, Patent Literature 1 below discloses a radar that adjusts a stack factor, which is an interval between beams, in such a manner that a maximum gain variation representing a sum of a variation in the antenna gain and a relative variation in the antenna gain in trough of the transmitted beam is kept constant at an azimuth angle within a specified azimuth monitoring region.

CITATION LIST

Patent Literature

Patent Literature 1: JP 2011-095038 A

SUMMARY OF INVENTION

Technical Problem

Since the radars in the related art are configured as explained above, they can improve the search data rate. Since, however, this configuration is not such that less beams are arranged in directions with low target presence probability and as many beams as possible are arranged in directions with high target presence probability, the direction in which a target is searched for often does not match with any of the directions in which beams are emitted but corresponds to a direction between two adjacent beam emitting directions. In the case that the direction in which a target is searched for corresponds to a direction between two adjacent beam emitting directions, the detection probability of the target is lowered, and the search distance of the target is shortened.

Embodiments of the present disclosure have been made to solve such problems as described above, and an object thereof is to obtain a radar and a beam control method capable of increasing the target detection probability and extending the target search distance.

Solution to Problem

A radar according to the present disclosure includes: an antenna for emitting beams of electromagnetic waves into space in which a target is present, and receiving electromagnetic waves that are reflected from the target and return to the antenna; a signal processing unit for performing signal processing to detect the target from the electromagnetic waves received by the antenna; an information acquiring unit for acquiring direction information indicating a direction in which the target is to be searched for and observation accuracy information indicating observation accuracy in the direction; a beam arrangement determining unit for determining an arrangement of beams to be emitted by the antenna from the direction information and the observation accuracy information acquired by the information acquiring unit; and a beam controlling unit for controlling directions of the beams to be emitted by the antenna in accordance with the arrangement of beams determined by the beam arrangement determining unit.

Advantageous Effects of Invention

According to the present disclosure, an information acquiring unit for acquiring direction information indicating the direction in which a target is to be searched for and observation accuracy information indicating the observation accuracy in the direction, and a beam arrangement determining unit for determining the arrangement of a plurality of beams to be emitted by the antenna on the basis of the direction information and the observation accuracy information acquired by the information acquiring unit are provided, and a beam controlling unit controls the directions of the beams to be emitted by the antenna according to the arrangement of the beams determined by the beam arrangement determining unit, which produces effects of increasing the detection probability of the target and extending the search distance of the target.

BRIEF DESCRIPTION OF DRAWINGS

FIG. 3 is a hardware configuration diagram of a computer in a case where the digital signal processor 4 of the radar is implemented by software, firmware, or the like.

FIG. 4 is a flowchart illustrating a beam control method that is a series of procedures performed by the digital signal processor 4 in the case where the digital signal processor 4 of the radar is implemented by software, firmware, or the like.

DESCRIPTION OF EMBODIMENTS

Hereinafter, to explain the present disclosure in more detail, embodiments according to the present disclosure will now be described with reference to the accompanying drawings.

First Embodiment

Figure 1:
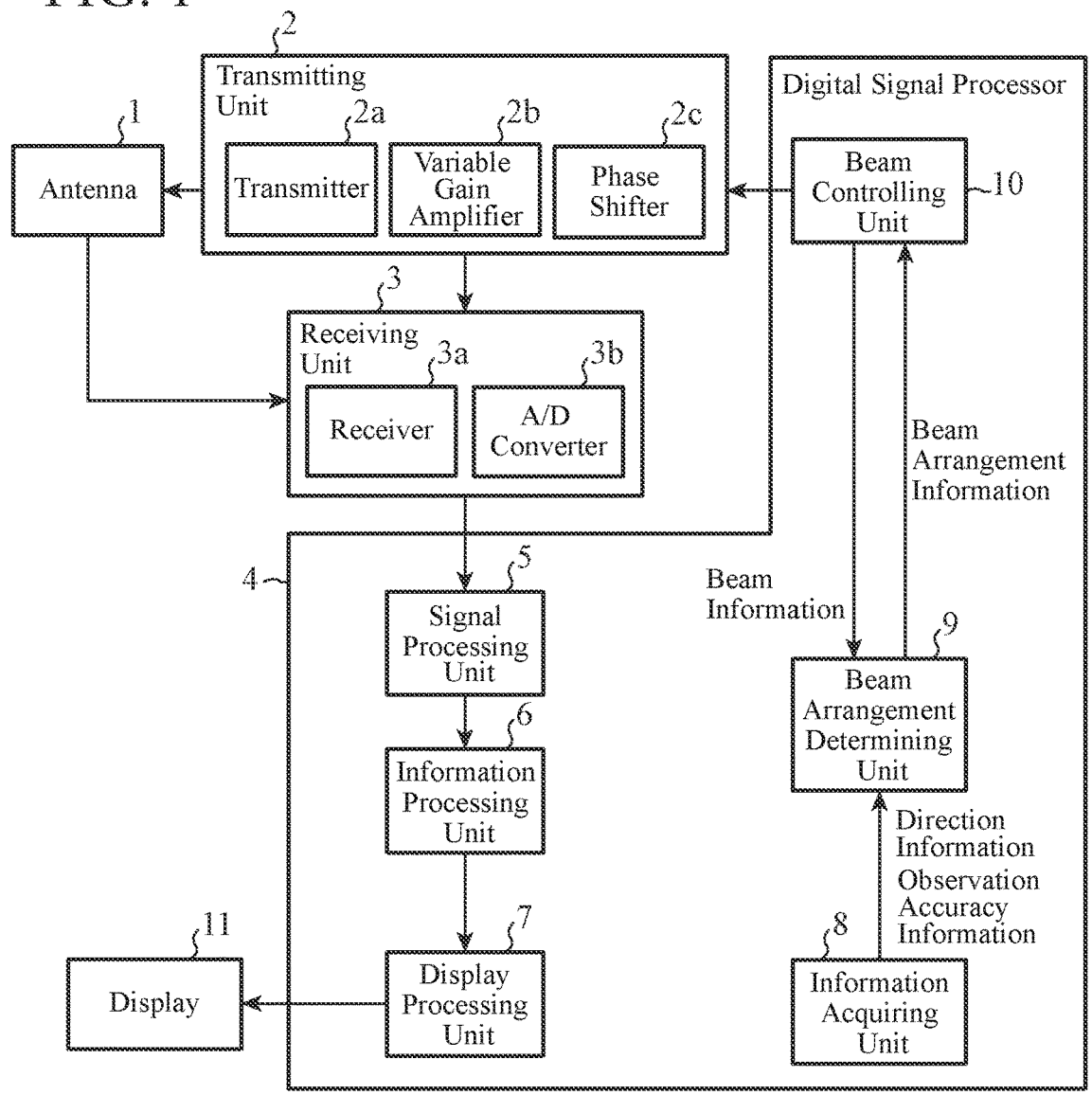
FIG. 1 is a configuration diagram illustrating a radar according to First Embodiment of the present disclosure.
Figure 2:
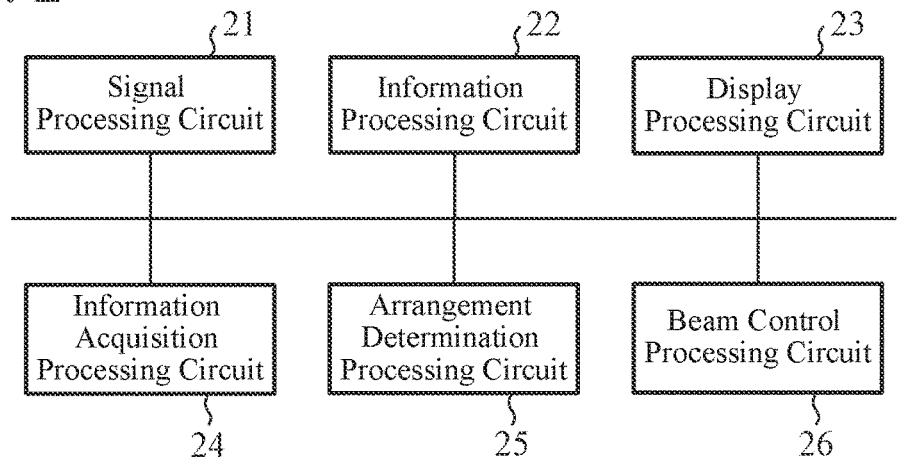
FIG. 2 is a hardware configuration diagram of a digital signal processor 4 of the radar according to First Embodiment of the present disclosure.

FIG. 1 is a configuration diagram illustrating a radar according to First Embodiment of the present disclosure, and FIG. 2 is a hardware configuration diagram of a digital signal processor 4 of the radar according to First Embodiment of the present disclosure.

In FIGS. 1 and 2, as an antenna 1, for example, a phased array antenna is used. The antenna 1 emits beams of electromagnetic waves into space in which one or more targets are present, and receives the electromagnetic waves that are reflected from the targets and return to the antenna 1.

Electromagnetic waves transmitted and received by the antenna 1 are assumed to be pulse signals in First Embodiment, but the electromagnetic waves are not limited to pulse signals and may be continuous waves, for example.

A transmitting unit 2 includes, for example, a transmitter 2a, a variable gain amplifier 2b, a phase shifter 2c, and the like. The transmitter 2a of the transmitting unit 2 generates pulse signals to be emitted into space, and outputs the pulse signals.

The variable gain amplifier 2b of the transmitting unit 2 amplifies the pulse signals output from the transmitter 2a with a gain set by a beam controlling unit 10.

The phase shifter 2c of the transmitting unit 2 shifts the phase of each pulse signal amplified by the variable gain amplifier 2b by a phase shift amount set by the beam controlling unit 10.

A receiving unit 3 includes a receiver 3a, an analog-to-digital converter 3b (hereinafter referred to as an "A/D converter") and the like, for example.

The receiver 3a of the receiving unit 3 detects pulse signals received by the antenna 1 by using a reference signal output from the transmitting unit 2.

The A/D converter 3b of the receiving unit 3 converts the pulse signals detected by the receiver 3a from analog signals into digital signals, and outputs the digital signals to the digital signal processor 4.

The digital signal processor 4 includes a signal processing unit 5, an information processing unit 6, a display processing unit 7, an information acquiring unit 8, a beam arrangement determining unit 9, and the beam controlling unit 10.

The signal processing unit 5 is implemented by a signal processing circuit 21 in FIG. 2, for example, and performs a variety of signal processing operations on the digital signals output from the receiving unit 3.

Examples of the variety of signal processing operations include: pulse compression processing for performing pulse compression on the digital signals; unwanted signal suppression processing for suppressing unwanted signals such as clutters included in the digital signals; integration processing for amplifying target signals included in the digital signals to have a desired signal to noise ratio (SN); target detection processing such as constant false alarm rate (CFAR) for detecting target signals contained in the digital signals; angle measurement processing such as multiple signal classification (MUSIC) for measuring a direction such as azimuth angle and elevation angle in which a target is present; and Doppler processing for calculating a Doppler velocity of a target. By performing part or all of the processing, the signal processing unit 5 performs operations of calculating a distance from the radar to a target, a direction in which a target is present, a Doppler velocity of the target, a calculation accuracy of the Doppler velocity, or the like.

The information processing unit 6 is implemented by an information processing circuit 22 in FIG. 2, for example, and performs processing for associating one or more target signals detected by the signal processing unit 5 with one or more targets present in space and with the track of one or more targets present in the space by performing correlation or the like of one or more target signals detected by the signal processing unit 5 with one or more target signals detected previously.

The display processing unit 7 is implemented by a display processing circuit 23 in FIG. 2, for example, and performs processing for displaying the target signals of the targets associated by the information processing unit 6, the distances to the targets calculated by the signal processing unit 5, the directions in which the targets are to be searched for, the Doppler velocities of the targets, the calculation accuracy of the Doppler velocities, and the like on a display 11, for example.

The information acquiring unit 8 is implemented by an information acquisition processing circuit 24 in FIG. 2, for example, and performs processing for acquiring direction information indicating a direction in which a target is searched for and observation accuracy information indicating the observation accuracy in the direction from other sensors connected via a network, for example.

While an example in which direction information indicating an azimuth angle at which a target is searched for is acquired as the direction in which a target is searched for is described in First Embodiment, direction information indicating an elevation angle at which a target is searched for may be acquired.

Examples of other sensors include a radar sensor, an electronic support (ES) sensor, an electronic optical (EO) sensor, and an infrared (IR) sensor.

The beam arrangement determining unit 9 is implemented by an arrangement determination processing circuit 25 in FIG. 2, for example, and performs processing for determining an arrangement of a plurality of beams to be emitted by the antenna 1 on the basis of the direction information and the observation accuracy information acquired by the information acquiring unit 8 and beam information output from the beam controlling unit 10, and outputting beam arrangement information indicating the arrangement of the beams to the beam controlling unit 10.

The beam controlling unit 10 is implemented by a beam control processing circuit 26 in FIG. 2, for example, and performs processing for controlling the directions of a plurality of beams to be emitted by the antenna 1 by controlling the excitation coefficient of the antenna 1 in accordance with the arrangement of beams indicated by the beam arrangement information output from the beam arrangement determining unit 9, for example.

In addition, the beam controlling unit 10 stores the center azimuth $S_0$ of each of beams of pulse signal to be transmitted and received by the antenna 1 and the half power width B of each beam, for example, as the beam information associated with the antenna pattern of the antenna 1, and performs processing for outputting the beam information to the beam arrangement determining unit 9.

The display 11 is a display device such as a liquid crystal display, for example.

In FIG. 1, the signal processing unit 5, the information processing unit 6, the display processing unit 7, the information acquiring unit 8, the beam arrangement determining unit 9, and the beam controlling unit 10, which are components of the digital signal processor 4 of the radar, are assumed to be implemented by dedicated hardware as illustrated in FIG. 2, that is, the signal processing circuit 21, the information processing circuit 22, the display processing circuit 23, the information acquisition processing circuit 24, the arrangement determination processing circuit 25, and the beam control processing circuit 26, respectively.

Note that the signal processing circuit 21, the information processing circuit 22, the display processing circuit 23, the information acquisition processing circuit 24, the arrangement determination processing circuit 25, and the beam control processing circuit 26 may each be a single circuit, a composite circuit, a programmed processor, a parallel-programmed processor, an application specific integrated circuit (ASIC), a field-programmable gate arrays (FPGA), or may be a combination thereof, for example.

The components of the digital signal processor 4 of the radar are, however, not limited to those implemented by dedicated hardware, and the digital signal processor 4 may be implemented by software, firmware, or combination of software and firmware.

The software and firmware are stored in a memory of a computer in the form of programs. The computer refers to hardware for executing programs, and may be a central processing unit (CPU), a central processor, a processing unit, a computing unit, a microprocessor, a microcomputer, a processor, a digital signal processor (DSP) or the like, for example.

In addition, the memory of the computer may be non-volatile or volatile semiconductor memory such as a random access memory (RAM), a read only memory (ROM), a flash memory, an erasable programmable read only memory (EPROM), or an electrically erasable programmable read only memory (EEPROM), a magnetic disk, a flexible disk, an optical disk, a compact disc, a mini disc, a digital versatile disc (DVD) or the like, for example.

Figure 3:
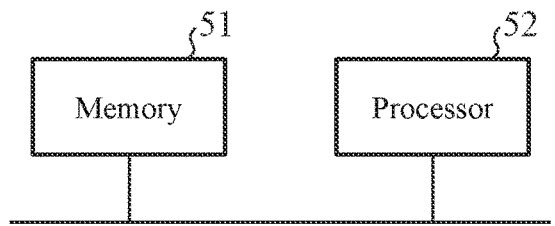

FIG. 3 is a hardware configuration diagram of the computer in a case where the digital signal processor 4 of the radar is implemented by software, firmware, or the like.

In the case where the digital signal processor 4 of the radar is implemented by software, firmware, or the like, programs for causing the computer to perform the procedures of the signal processing unit 5, the information processing unit 6, the display processing unit 7, the information acquiring unit 8, the beam arrangement determining unit 9, and the beam controlling unit 10 may be stored in a memory 51, and a processor 52 of the computer may execute the programs stored in the memory 51.

Figure 4:
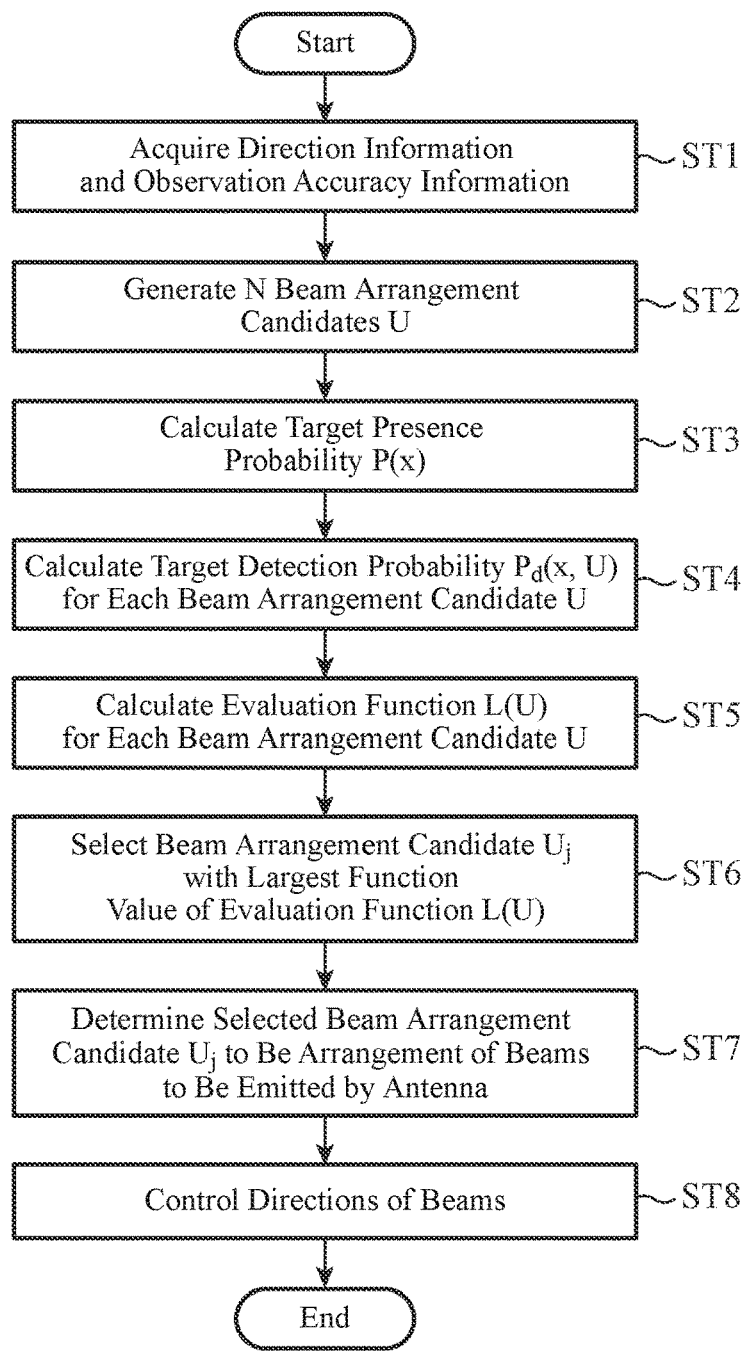

FIG. 4 is a flowchart illustrating a beam control method that is a series of procedures performed by the digital signal processor 4 in the case where the digital signal processor 4 of the radar is implemented by software, firmware, or the like.

While an example in which the components of the digital signal processor 4 of the radar are each implemented by dedicated hardware is illustrated in FIG. 2 and an example in which the digital signal processor 4 of the radar is implemented by software, firmware, and the like is illustrated in FIG. 3, some components of the digital signal processor 4 may be implemented by dedicated hardware and the others may be implemented by software, firmware, and the like.

For example, the display processing unit 7 and the information acquiring unit 8 can be implemented by dedicated hardware, and the signal processing unit 5, the information processing unit 6, the beam arrangement determining unit 9, and the beam controlling unit 10 can be implemented by software, firmware, and the like. Note that dedicated hardware, software, and the like can be in any combination.

Next, operation will be explained.

In First Embodiment, it is assumed that another sensor such as an ES sensor has detected a target before the radar of FIG. 1 detects the target.

Sensors such as an ES sensor typically have characteristics of being low in accuracy of observation of the direction and the like in which a target is present but being capable of detecting a target in the distance.

The transmitter 2a of the transmitting unit 2 generates pulse signals, outputs the pulse signals to the variable gain amplifier 2b, and also outputs the pulse signals as reference signals to the receiving unit 3.

The variable gain amplifier 2b of the transmitting unit 2 has a gain set by the beam controlling unit 10, which will be described later, and amplifies the pulse signals generated by the transmitter 2a with the set gain.

The phase shifter 2c has a phase shift amount set by the beam controlling unit 10, which will be described later, shifts the phases of the pulse signals amplified by the variable gain amplifier 2b by the set phase shift amount, and outputs the phase-shifted pulse signals to the antenna 1.

While an example in which the variable gain amplifier 2b amplifies the pulse signals and the phase shifter 2c then shifts the phases of the pulse signals is presented herein, the phase shifter 2c may shift the phases of the pulse signals and the variable gain amplifier 2b may then amplify the pulse signals.

In a case where the antenna 1 is a phased array antenna that is constituted by a plurality of subarrays, for example, pulse signals corresponding to the number of subarrays are output from the transmitting unit 2.

The antenna 1 emits the pulse signals output from the transmitting unit 2 into space in which a target is present, and then receives the pulse signals that are reflected from the target and return to the antenna 1.

In the case where the antenna 1 is a phased array antenna that is constituted by a plurality of subarrays, the pulse signals are emitted to the space from the respective subarrays.

The amplitudes and the phases of the pulse signals are adjusted by the variable gain amplifier 2b and the phase shifter 2c, which results in adjustment of the excitation coefficients of the subarrays, and beams of the pulse signals are arranged at positions associated with the excitation coefficients.

The receiver 3a of the receiving unit 3 detects the pulse signals received by the antenna 1 by using the reference signals output from the transmitting unit 2.

Specifically, in the case where the antenna 1 is constituted by a plurality of subarrays, the receiver 3a of the receiving unit 3 detects each of the pulse signals received by the respective subarrays.

The A/D converter 3b of the receiving unit 3 converts the pulse signals detected by the receiver 3a from analog signals into digital signals, and outputs the digital signals to the digital signal processor 4.

Upon receiving the digital signals from the receiving unit 3, the signal processing unit 5 of the digital signal processor 4 performs a variety of signal processing operations on the digital signals.

Examples of the variety of signal processing operations include: pulse compression processing for performing pulse compression on the digital signals; unwanted signal suppression processing for suppressing unwanted signals such as clutters included in the digital signals; integration processing for amplifying target signals included in the digital signals to have a desired SN; target detection processing such as CFAR for detecting target signals contained in the digital signals; angle measurement processing such as MUSIC for measuring a direction such as azimuth angle and elevation angle in which a target is present; and Doppler processing for calculating a Doppler velocity of a target. By performing part or all of the processing, the signal processing unit 5 calculates a distance from the radar to a target, a direction in which a target is present, a Doppler velocity of the target, a calculation accuracy of the Doppler velocity, or the like.

A target present in the distance can be detected in the case that a beam arrangement of the antenna 1 is properly positioned, but at a stage at which the beam arrangement of the antenna 1 is not properly positioned, a target present in the distance may not be detected depending on the direction in which the target is searched for.

In First Embodiment, the beam arrangement of the antenna 1 is determined to be located at proper positions by the beam arrangement determining unit 9, which will be described later.

When the signal processing unit 5 detects one or more target signals, the information processing unit 6 of the digital signal processor 4 performs correlation processing or the like between the one or more target signals and one or more target signals detected previously to identify which of the targets present in the space the one or more target signals are associated with.

In addition, it is also identified which of the tracks of the targets present in the space the one or more target signals are associated with.

When a target is detected by the signal processing unit 5, the display processing unit 7 displays, for example, the target signals of the respective targets associated by the information processing unit 6, the distances to the targets calculated by the signal processing unit 5, the directions in which the targets are present, the Doppler velocities of the targets, the calculation accuracy of the Doppler velocities, and the like on the display 11.

The information acquiring unit 8 of the digital signal processor 4 acquires, for example, the direction information indicating the directions in which the targets are to be searched for and the observation accuracy information indicating the observation accuracies in the directions from other sensors connected via a network, and outputs the direction information and the observation accuracy information to the beam arrangement determining unit 9 (step ST1 in FIG. 4).

The directions indicated by the direction information are directions in which the targets observed by the other sensors are present, and the information acquiring unit 8 acquires direction information indicating the directions in which the targets observed by the other sensors are present as the direction information indicating the directions in which the targets are to be searched for.

In Embodiment 1, it is assumed that as a direction in which a target is to be searched for direction information indicating azimuth angle α at which a target is to be searched for is acquired, and that observation accuracy information indicating observation accuracy β at the azimuth angle α, at which the target is to be searched for, is acquired. However, direction information indicating an elevation angle at which a target is to be searched for and observation accuracy information indicating an observation accuracy at the elevation angle, at which the target is to be searched for, may be acquired.

Upon receiving the direction information and the observation accuracy information from the information acquiring unit 8, the beam arrangement determining unit 9 of the digital signal processor 4 determines an arrangement of a plurality of beams emitted by the antenna 1 on the basis of the direction information, the observation accuracy information, and the beam information output from the beam controlling unit 10, and outputs beam arrangement information indicating the arrangement of beams to the beam controlling unit 10.

While the beam arrangement determining unit 9 receives the beam information from the beam controlling unit 10 herein, an antenna pattern of the antenna 1 may be received from the beam controlling unit 10 since the beam information is information relating to the antenna pattern of the antenna 1.

Alternatively, the beam arrangement determining unit 9 may store the beam information or the antenna pattern of the antenna 1 in advance.

Processing for determining the arrangement of a plurality of beams performed by the beam arrangement determining unit 9 will be described below in detail.

First, the beam arrangement determining unit 9 generates N beam arrangement candidates U, which are candidates for an arrangement of a plurality of beams (step ST2 in FIG. 4).

Specifically, the beam arrangement determining unit 9 generates $U_1, U_2, \ldots, U_N$ as N beam arrangement candidates U.

Note that N is an integer not smaller than 2, and each of the beam arrangement candidates $U=\{U_1, U_2, U_N\}$ is expressed with an arrangement vector representing the arrangement of M (M is an integer not smaller than 2) beams, that is, a vector representing center azimuths of M beams as expressed by Expression (1) as follows.

$$U=\{u_1, u_2, \ldots, u_M\} \quad (1)$$

Since generation of N beam arrangement candidates U is a known technique, detailed description thereof will not be provided; the beam arrangement candidates U are generated such that more beams are arranged in a certain direction than in the other directions rather than such that M beams are arranged at uniform intervals within a predetermined azimuth monitoring range. Note that the certain direction in which more beams are arranged differs among the N beam arrangement candidates U.

Figure 5:
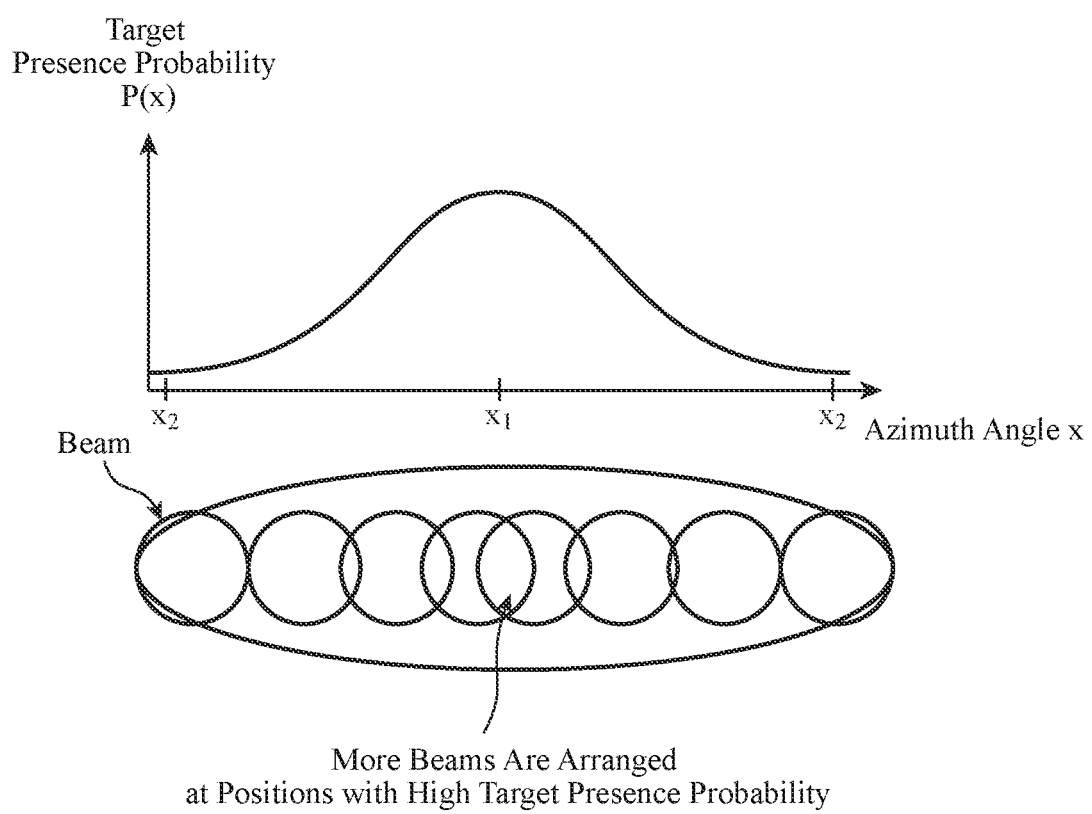
FIG. 5 is an explanatory diagram illustrating arrangement of a plurality of beams emitted by an antenna 1.

In the example of FIG. 5, more beams are arranged at the azimuths near the center of the predetermined azimuth monitoring range than at the other azimuths, details of which will be described later.

Subsequently, upon receiving the direction information and the observation accuracy information from the information acquiring unit 8, the beam arrangement determining unit 9 calculates target presence probability P(x) on the basis of the azimuth angle α indicated by the direction information and the observation accuracy β, at the azimuth angle α indicated by the observation accuracy information (step ST3).

The target presence probability P(x) is a normal distribution having a standard deviation centered on the azimuth angle α, the standard deviation being equal to the observation accuracy $\beta$, and indicates the target presence probability at an azimuth angle x at which a target is assumed to be present.

The presence probability P(x) of a target can be expressed by Expression (2) below.

$$P(x) = \frac{1}{\sqrt{2\pi\beta^2}} \exp\left(-\frac{(x-\alpha)^2}{2\beta^2}\right) \tag{2}$$

The beam arrangement determining unit 9 also calculates detection probability $P_d(x, U)$ of a target for each of the beam arrangement candidates U by using the SN of the center azimuth $S_0$ and the half power width B of each beam indicated by the beam information output from the beam controlling unit 10 (step ST4). As described earlier, SN is an abbreviation of and stands for "Signal to Noise ratio".

Specifically, the beam arrangement determining unit 9 calculates target detection probabilities $P_d(x, U_1)$, $P_d(x, U_2)$, ..., $P_d(x, U_N)$ for the N respective beam arrangement candidates $U_1, U_2, \ldots, U_N$.

A method for calculating the target detection probability $P_d(x, U)$ will be described below.

In First Embodiment, an example of calculation of the detection probability according to an interbeam correlation technique called "one of two detection," in which a target is deemed to be detected if two beams are emitted from the antenna and if one or more target signals are detected, will be described as the calculation of the target detection probability $P_d(x, U)$.

For calculation of the detection probability as the detection probability $P_d(x, U)$ of a target according to the one of two detection, the beam arrangement determining unit 9 calculates the target detection probability $P_d(x, U)$ as in Expression (3) as follows.

$$P_d(x,U)=1-(1-P_c(X,SN(x,u_r),y))(1-P_c(X,SN(x,u_s),y)) \tag{3}$$

In Expression (3), $P_c$ represents a missed detection probability of the target, X represents an average SN, and y represents a detection threshold.

In addition, $u_r$ represents a beam azimuth that is closest to the azimuth angle x at which the target is assumed to be present, and $u_s$ represents a beam azimuth that is second closest to the azimuth angle x at which the target is assumed to be present.

$SN(x, u_i)$ represents an SN in the direction of the azimuth angle x in the case that the center azimuth of a beam is $u_i$.

Note that, since the SN is lower at a position farther from the center azimuth $u_i$ of the beam, the center $SN(x, u_i)$ is calculated on the basis of the antenna pattern at the time that the beam is transmitted and received by the antenna 1.

Specifically, $SN(x, u_i)$ is calculated from a reference SN at the center azimuth of the beam and the half power width B of the beam indicated by the beam information associated with the antenna pattern at the time that the beam is transmitted and received by the antenna 1, as expressed by Expression (4) below.

$$SN(x, u_i) = S_0\left(\exp\left(-4\log(2)\left(\frac{(u_i - x)}{B}\right)^2\right)\right)^2 \tag{4}$$

In Expression (4), i represents the beam number, $u_i$ represents the center azimuth of the beam, and $S_0$ represents the reference SN at the center azimuth ($x=u_i$) of the beam.

While it is assumed herein that the beam arrangement determining unit 9 calculates $SN(x, u_i)$ by using the beam information associated with the antenna pattern output from the beam controlling unit 10, $SN(x, u_i)$ expressed by Expression (4) may be given to the beam arrangement determining unit 9 by the beam controlling unit 10 since Expression (4) is an approximation of the antenna pattern using an exponential function.

The missed detection probability $P_c$ of the target in Expression (3) can be calculated in accordance with, for example, Expression (5) as a detection probability after performing amplitude detection in the case of Swerling Case 0.

$$P_c(X,v,y)=\int_0^y 2ve^{-(v^2+x^2)}I_0(2Xv)dv$$

$$v=SN(x,u_i) \tag{5}$$

In Expression (5), $I_0$ represents a modified Bessel function of the first kind.

Although a method of calculating that as a detection probability after performing amplitude detection in the case of Swerling Case 0, which is non-limiting. The detection probability may be calculated depending on an assumed target.

In addition, the detection threshold y in Expression (3) can be calculated as in Expression (6) as follows.

$$y=\sqrt{-\log(1-\sqrt{1-Pfa})} \tag{6}$$

In Expression (6), Pfa represents a desired false alarm probability.

While the example in which the target detection probability $P_d(x, U)$ is calculated as a detection probability according to the interbeam correlation technique called "one of two detection" is presented, this is merely an example, and the detection probability $P_d(x, U)$ of a target may be calculated as a detection probability according to an interbeam correlation technique called "one of four detection" or an interbeam detection technique called "N of four detection" disclosed in Non-patent Literature 1 below.

Note that "one of four detection" is to determine that a target is detected if four beams are emitted from the antenna 1 and if one or more target signals are detected, and "N of four detection" is to determine that a target is detected if four beams are emitted from the antenna 1 and if N or more target signals are detected. N is an integer not smaller than 1, and examples of N=1 to 4 are disclosed in Non-patent Literature 1.

Non-patent Literature 1: Shoji Matsuda, Hiroyuki Hashiguchi, and Shoichiro Fukao, "A Study on Target Detection and Beam Arrangement Methods for a Multi-Beam Radar," The transactions B of the Institute of Electronics, Information and Communication Engineers, J87-B, 1094-1105, 2004.

After calculating the target presence probability P(x) and the target detection probability $P_d(x, U)$ for each of the beam arrangement candidates U, the beam arrangement determining unit 9 calculates as shown in Expression (7) an evaluation function L(U) of each of the beam arrangement candidates U by using the target presence probability P(x) and the target detection probability $P_d(x, U)$ for each of the beam arrangement candidates U as follows (step ST5).

Specifically, the beam arrangement determining unit 9 calculates evaluation functions $L(U_1), L(U_2), \ldots, L(U_N)$ of the N respective beam arrangement candidates $U_1, U_2, \ldots, U_N$.

$$L(U)=E_{P(x)}[P_d(x,U)]=\int P_d(x,U)P(x)dx \tag{7}$$

In Expression (7), $E_{p(x)}[P_d(x, U)]$ represents averaging the target detection probability $P_d(x, U)$ with the target presence probability $P(x)$.

After calculating the evaluation functions $L(U_1)$, $L(U_2)$, ..., $L(U_N)$ of the N respective beam arrangement candidates $U_1$, $U_2$, ..., $U_N$, the beam arrangement determining unit 9 compares the function values of the evaluation functions $L(U_1)$, $L(U_2)$, ..., $L(U_N)$ of the N respective beam arrangement candidates $U_1$, $U_2$, ..., $U_N$ to select a beam arrangement candidate having a relatively large function value from the N beam arrangement candidates $U_1$, $U_2$, ..., $U_N$. For example, beam arrangement candidates $U_1$ to $U_N$ having different stack factors are provided, and a beam arrangement candidate with a larger function value is selected, which allows search of a stack factor with which the detection probability is high.

Specifically, the beam arrangement determining unit 9 selects a beam arrangement candidate with the largest function value of the evaluation function $L(U_1)$ from among the N beam arrangement candidates $U_1$, $U_2$, ..., $U_N$ as expressed by Expression (8) as follows (step ST6).

$$U_j = \underset{i}{\operatorname{argmax}}(L(U_i)) \qquad (8)$$

The beam arrangement determining unit 9 determines the selected beam arrangement candidate to be the arrangement of the beams to be emitted by the antenna 1, and outputs beam arrangement information indicating the determined arrangement of the beams to the beam controlling unit 10 (step ST7).

Upon receiving the beam arrangement information from the beam arrangement determining unit 9, the beam controlling unit 10 controls the directions of the beams to be emitted by the antenna 1 by controlling the transmitting unit 2 in accordance with the arrangement of the beams indicated by the beam arrangement information (step ST8).

Specifically, the beam controlling unit 10 controls the directions of the beams to be emitted from the antenna 1 by controlling the excitation coefficients of the antenna 1 by setting both the gain of the variable gain amplifier 2b of the transmitting unit 2 and the phase shift amount of the phase shifter 2c of the transmitting unit 2 so that the arrangement of the beams to be emitted by the antenna 1 matches the arrangement of beams indicated by the beam arrangement information.

Here, FIG. 5 is an explanatory drawing illustrating an arrangement of beams emitted by the antenna 1.

Since the beam controlling unit 10 controls the directions of the beams to be emitted by the antenna 1 so that the arrangement of the beams to be emitted by the antenna 1 matches the arrangement of beams indicated by the beam arrangement information, less beams are arranged at an azimuth angle $x=x_2$ at which the presence probability $P(x)$ of the target is low while more beams are arranged at an azimuth angle $x=x_1$ at which the presence probability $P(x)$ of the target is high as illustrated in FIG. 5.

This increases the probability that the direction in which the target is searched for matches with any of the beam emitting directions, which improves the detection probability of target in the signal processing unit 5.

As is clear from the description above, according to First Embodiment, the information acquiring unit 8 for acquiring direction information indicating the direction in which a target is to be searched for and observation accuracy information indicating the observation accuracy in the direction, and the beam arrangement determining unit 9 for determining the arrangement of a plurality of beams to be emitted by the antenna 1 on the basis of the direction information and the observation accuracy information acquired by the information acquiring unit 8 are provided, and the beam controlling unit 10 controls the directions of the beams to be emitted by the antenna 1 in accordance with the arrangement of the beams determined by the beam arrangement determining unit 9, which produces effects of increasing the detection probability of the target and extending the search distance of the target.

The configuration in which the beam arrangement determining unit 9 determines the arrangement of beams to be emitted by the antenna 1 on the basis of the direction information and the observation accuracy information output from the information acquiring unit 8 is presented in First Embodiment; however, since the accuracy of the azimuth angle $\alpha$ indicated by the direction information output from the information acquiring unit 8 is typically low, processing for increasing the accuracy of the azimuth angle $\alpha$ may be performed and the arrangement of beams may be determined with use of the azimuth angle $\alpha$ increased in accuracy.

Specifically, upon receiving direction information from the information acquiring unit 8, the beam arrangement determining unit 9 accumulates the direction information.

The beam arrangement determining unit 9 then uses the accumulated time-series direction information in performing tracking of the azimuth angle $\alpha$ at which a target is to be searched for so as to reduce error in the azimuth angle $\alpha$. The tracking of the azimuth angle $\alpha$ may be tracking using a Kalman filter, for example. Since the tracking is a known technique, detailed description thereof will not be provided.

The beam arrangement determining unit 9 determines the arrangement of the beams to be emitted by the antenna 1 on the basis of the direction information indicating the azimuth angle $\alpha$ resulting from the tracking and the observation accuracy information indicating the observation accuracy $\beta$ of the azimuth angle $\alpha$ resulting from the tracking.

In addition, the configuration in which the beam arrangement determining unit 9 calculates the presence probability $P(x)$ of a target from the azimuth angle $\alpha$ indicated by the direction information output from the information acquiring unit 8 and the observation accuracy $\beta$ of the azimuth angle $\alpha$ indicated by the observation accuracy information output from the information acquiring unit 8 is presented in First Embodiment; however, in the case where the tracking of the azimuth angle $\alpha$ at which the target is to be searched for is performed, tracking error distribution such as smoothing error distribution or prediction error distribution of the azimuth angle $\alpha$ obtained by the tracking may be used for the target presence probability $P(x)$.

Second Embodiment

While the configuration in which the beam arrangement determining unit 9 calculates the detection probability $P_d(x, U)$ of the target for each of the beam arrangement candidates U and determines the arrangement of beams to be emitted by the antenna 1 by using the detection probabilities $P_d(x, U)$ of the target is presented in First Embodiment, a configuration in which the beam arrangement determining unit 9 calculates a gain of the antenna 1 for each of the beam arrangement candidates U and determines the arrangement of beams to be emitted by the antenna 1 by using the gains of the antenna 1 will be described in Second Embodiment.

The configuration diagram of the radar is FIG. 1 as is the case with First Embodiment.

Specifically, the configuration is as follows.

The beam arrangement determining unit 9 calculates the SN of a beam with the emitting direction closest to an azimuth angle x at which the target is assumed to be present as the gain of the antenna 1 for each of the beam arrangement candidates U among M beams to be emitted by the antenna 1. $SN_{max}(x, U)$ that is the SN of the beam with the emitting direction closest to the azimuth angle x is expressed by Expression (9) as shown below.

Since the SN of a beam is directly proportional to the gain of the antenna 1, calculation of the SN of a beam corresponds to calculation of the gain of the antenna 1.

$$SN_{max}(x, U) = \max_i (SN_i(x, u_i)) \qquad (9)$$

The beam arrangement determining unit 9 calculates the target presence probability P(X) in the same manner as in First Embodiment, and calculates the evaluation function L(U) of each of the beam arrangement candidates U by using the target presence probability P(x) and $SN_{max}(x, U)$ that is the SN of the beam with the emitting direction closest to the azimuth angle x as expressed by Expression (10) as shown below.

Specifically, the beam arrangement determining unit 9 calculates evaluation functions $L(U_1), L(U_2), \ldots, L(U_N)$ of the N respective beam arrangement candidates $U_1, U_2, \ldots, U_N$.

$$L(U) = E_{p(x)}[\log(SN_{max}(x,U))] = \int \log(SN_{max}(x,U)) p(x) dx \qquad (10)$$

In Expression (10), $E_{p(x)}[\log(SN_{max}(x, U))]$ represents to average with the target presence probability P(x) the SN of the beam with the emitting direction closest to the azimuth angle x, that is, the gain of the antenna 1.

After calculating the evaluation functions $L(U_1)$, $L(U_2), \ldots, L(U_N)$ of the N respective beam arrangement candidates $U_1, U_2, \ldots, U_N$, the beam arrangement determining unit 9 compares the function values of the evaluation functions $L(U_1), L(U_2), \ldots, L(U_N)$ of the N respective beam arrangement candidates $U_1, U_2, \ldots, U_N$ to select a beam arrangement candidate having a relatively large function value from the N beam arrangement candidates $U_1, U_2, \ldots, U_N$, as explained in First Embodiment.

Specifically, the beam arrangement determining unit 9 selects a beam arrangement candidates with the largest function value of the evaluation function $L(U_1)$ from among the N beam arrangement candidates $U_1, U_2, \ldots, U_N$ as expressed by Expression (8) above.

The beam arrangement determining unit 9 determines the selected beam arrangement candidate to be the arrangement of the beams to be emitted by the antenna 1, and outputs beam arrangement information indicating the determined arrangement of the beams to the beam controlling unit 10.

As is clear from the description above, since the beam arrangement determining unit 9 is capable of selecting a proper beam arrangement candidates similarly to First Embodiment even by using the gain of the antenna 1 instead of the detection probability $P_d(x, U)$ of the target, the effects of increasing the detection probability of the target and extending the search distance of the target are produced.

Note that, while the configuration in which the beam arrangement determining unit 9 uses the detection probability $P_d(x, U)$ of the target is presented in First Embodiment and the configuration in which the beam arrangement determining unit 9 uses the gain of the antenna 1 is presented in Second Embodiment to select the beam arrangement candidate $U_j$, any other characteristic other than the target detection probability $P_d(x, U)$ and the gain of the antenna 1 may be used to select the beam arrangement candidate $U_j$. For example, a characteristic indicating a maximum target search distance can be used.

Third Embodiment

While the examples in which the number of beams to be emitted by the antenna 1 is fixed to M are presented in First and Second Embodiments, the number of beams to be emitted by the antenna 1 may be variable to reduce the beam resource.

Figure 6:
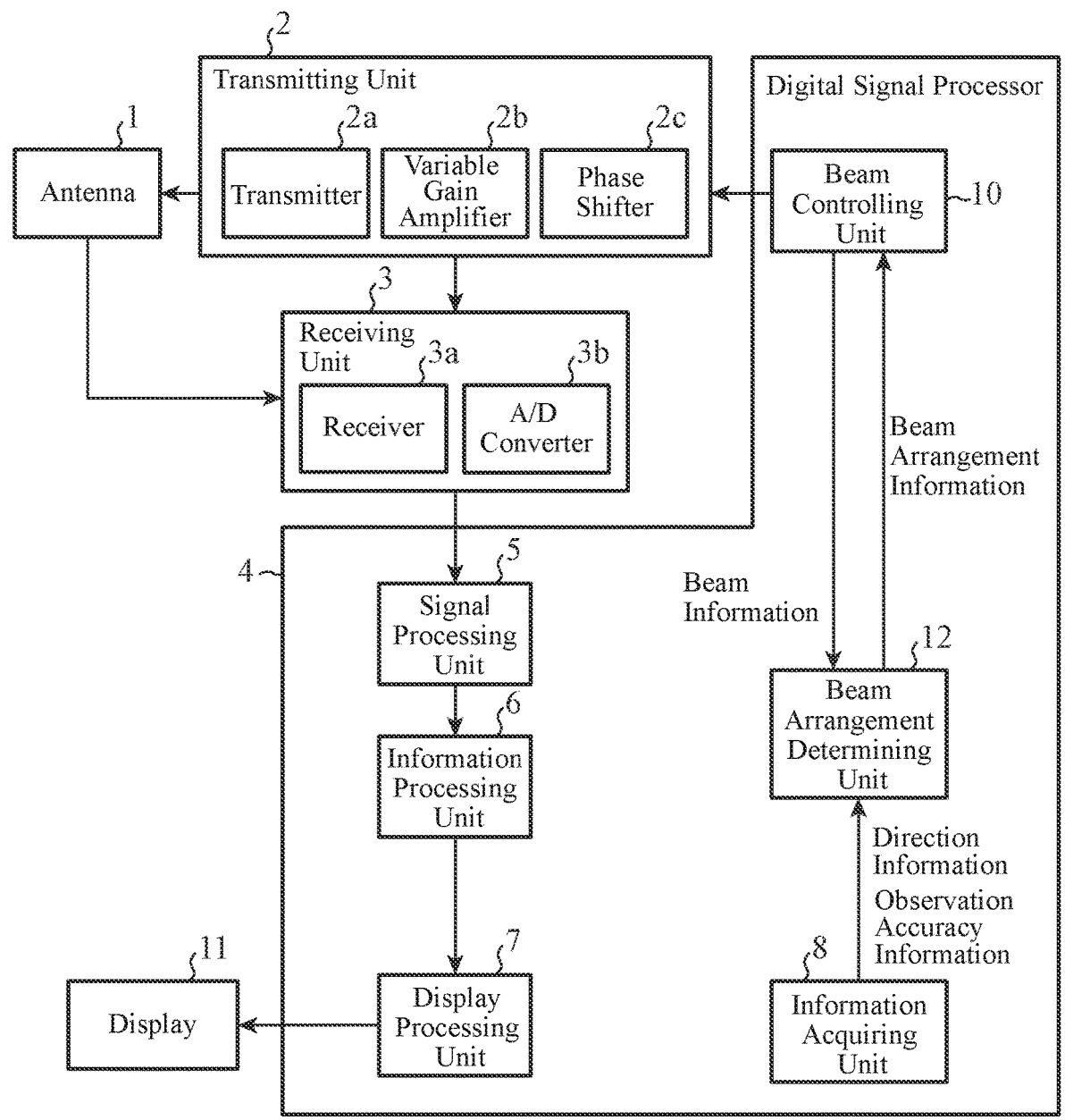
FIG. 6 is a configuration diagram illustrating a radar according to Third Embodiment of the present disclosure.

FIG. 6 is a configuration diagram illustrating a radar according to Third Embodiment of the present disclosure, in which the same reference numerals as those in FIG. 1 represent the same or corresponding components and the description thereof will thus not be repeated.

A beam arrangement determining unit 12 is implemented by the arrangement determination processing circuit 25 in FIG. 2, for example, and performs processing for determining an arrangement of a plurality of beams to be emitted by the antenna 1 on the basis of the direction information and the observation accuracy information acquired by the information acquiring unit 8 and the beam information output from the beam controlling unit 10, and outputting the beam arrangement information indicating the arrangement of the beams to the beam controlling unit 10, similarly to the beam arrangement determining unit 9 in FIG. 1.

The beam arrangement determining unit 12 is, however, different from the beam arrangement determining unit 9 in FIG. 1 in the procedures for determining the arrangement of beams to be emitted by the antenna 1.

In FIG. 6, the signal processing unit 5, the information processing unit 6, the display processing unit 7, the information acquiring unit 8, the beam arrangement determining unit 12, and the beam controlling unit 10, which are components of the digital signal processor 4 of the radar, are assumed to be implemented by dedicated hardware as illustrated in FIG. 2, that is, the signal processing circuit 21, the information processing circuit 22, the display processing circuit 23, the information acquisition processing circuit 24, the arrangement determination processing circuit 25, and the beam control processing circuit 26, respectively.

The components of the digital signal processor 4 of the radar are, however, not limited to those implemented by dedicated hardware, and the digital signal processor 4 may be implemented by software, firmware, or combination of software and firmware.

In the case where the digital signal processor 4 of the radar is implemented by software, firmware, or the like, programs for causing the computer to perform the procedures of the signal processing unit 5, the information processing unit 6, the display processing unit 7, the information acquiring unit 8, the beam arrangement determining unit 12, and the beam controlling unit 10 may be stored in the memory 51 illustrated in FIG. 3, and the processor 52 of the computer may execute the programs stored in the memory 51.

Figure 7:
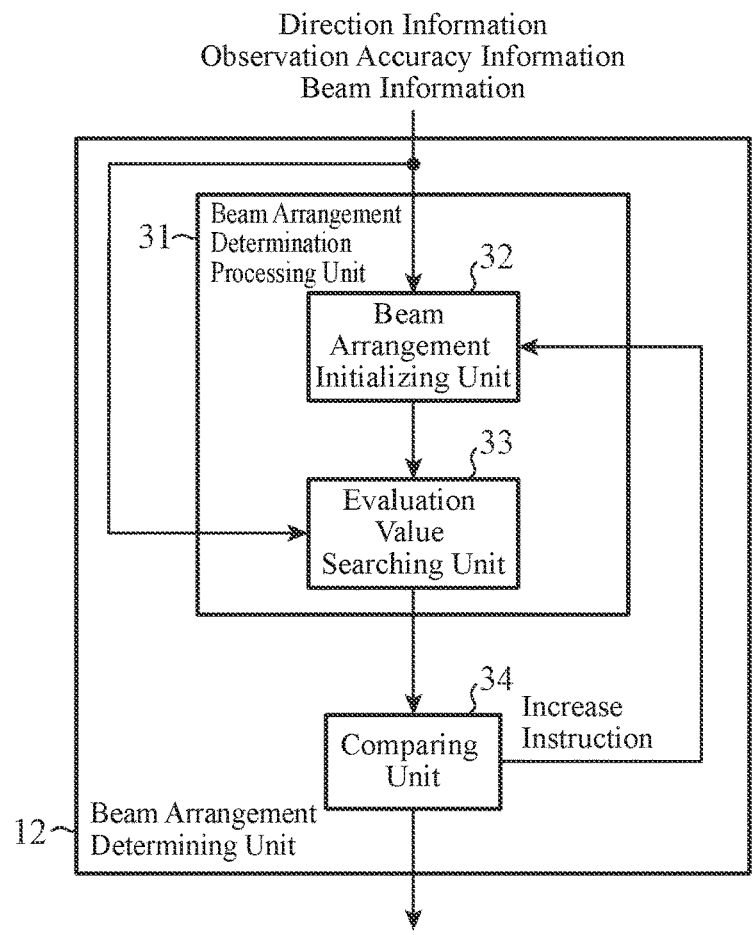
FIG. 7 is a configuration diagram illustrating a beam arrangement determining unit 12 of the radar according to Third Embodiment of the present disclosure.

FIG. 7 is a configuration diagram illustrating the beam arrangement determining unit 12 of the radar according to Third Embodiment of the present disclosure.

In FIG. 7, a beam arrangement determination processing unit 31 includes a beam arrangement initializing unit 32 and an evaluation value searching unit 33, and performs processing for increasing the number of beams to be emitted by the antenna 1 and determining the arrangement of the increased number of beams by using the direction information and the observation accuracy information acquired by the information acquiring unit 8.

The beam arrangement initializing unit 32 performs processing for setting the number of beams to be emitted by the antenna 1 to i, and initially setting one or more arrangements of beams for i beams.

In addition, upon receiving an instruction to increase the number of beams from a comparing unit 34, the beam arrangement initializing unit 32 increases the number of beams from i to (i+1), for example, and performs processing for initially setting one or more arrangements of beams for (i+1) beams.

The evaluation value searching unit 33 performs processing for calculating a function value of an evaluation function L(U) for evaluating the arrangements of beams determined by the beam arrangement initializing unit 32 and outputting to the comparing unit 34 the arrangement of beams associated with the function value that is obtained at the time that the gradient of function value is inverted.

In the case that the gain of the antenna 1 with the arrangement of beams output from the evaluation value searching unit 33 is larger than a reference value, the comparing unit 34 performs processing for determining the arrangement of beams output from the evaluation value searching unit 33 as the arrangement of beams to be emitted by the antenna 1.

In the case that the gain of the antenna 1 with the arrangement of beams output from the evaluation value searching unit 33 is not larger than the reference value, the comparing unit 34 performs processing for outputting an instruction to increase the number of beams to the beam arrangement initializing unit 32.

Next, operation will be explained.

Since Third Embodiment is the same as First and Second Embodiments except for the beam arrangement determining unit 12, the processing performed by the beam arrangement determining unit 12 will be explained here.

Figure 8:
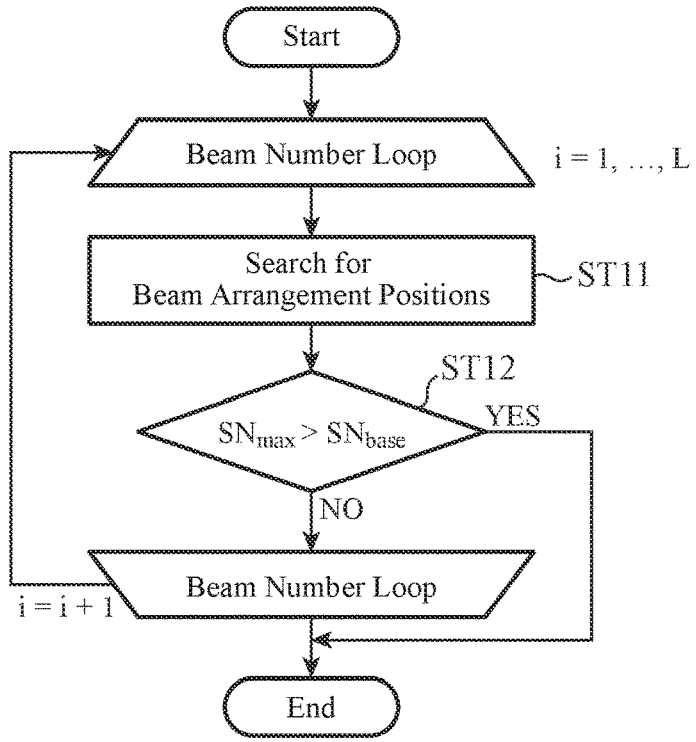
FIG. 8 is a flowchart illustrating procedures performed by the beam arrangement determining unit 12 of the radar according to Third Embodiment of the present disclosure.

FIG. 8 is a flowchart illustrating procedures of the beam arrangement determining unit 12 of the radar according to Third Embodiment of the present disclosure.

The beam arrangement initializing unit 32 of the beam arrangement determining unit 12 initializes the number of beams to be emitted by the antenna 1 to i, and arranges the center azimuths of the i beams to initially set one or more arrangements of beams for the case that the number of beams is i. In an initial stage, the number is i=1, for example.

Note that the center azimuth of the beam for the case i=1 is set to the azimuth angle $\alpha$ indicated by the direction information acquired by the information acquiring unit 8, for example. In addition, the center azimuths of a plurality of beams for the case i≥2 are arranged, for example, at regular intervals with the azimuth angle $\alpha$ positioned at the center.

After initially setting the arrangement of beams for the case that the number of beams is i, the beam arrangement initializing unit 32 outputs an i-dimensional arrangement vector $U_0$ representing the beam arrangement to the evaluation value searching unit 33.

Upon receiving the i-dimensional arrangement vector $U_0$ representing the beam arrangement, the evaluation value searching unit 33 performs an optimization technique using the i-dimensional arrangement vector $U_0$ as an initial value to search for an arrangement vector $U_b$ representing the optimum arrangement of i beams (step ST11 in FIG. 8).

Examples of the optimization methodology include the Gradient Descent Method and the Quasi-Newton Method.

The processing for performing an optimization technique to determine the optimum arrangement of i beams is a known technique and detailed description thereof will not be provided; for searching for the optimum arrangement of i beams, the evaluation value searching unit 33 calculates a function value of an evaluation function L(U) for evaluating the arrangement, and searches for an arrangement of beams associated with the function value at the time that the gradient of the function value is inverted, for example.

Note that an evaluation function calculated by Expression (7) or Expression (10) above, for example, can be used for the evaluation function L(U) for evaluating the arrangement.

Figure 9:
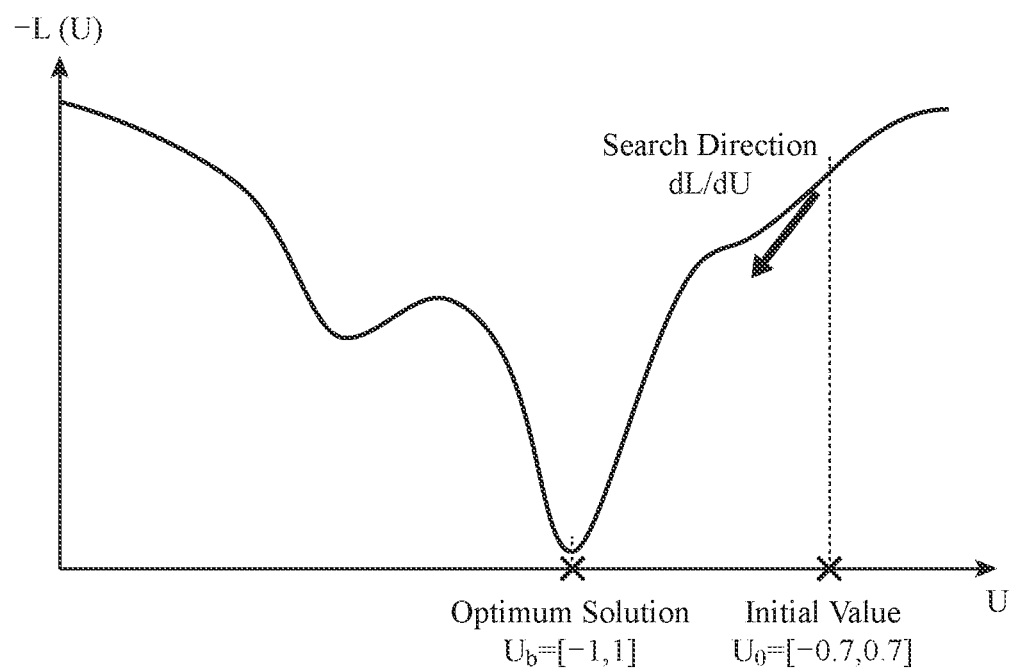
FIG. 9 is an explanatory graph illustrating a concept of search for beam arrangement vector according to a gradient method.

FIG. 9 is an explanatory graph illustrating a concept of search for a beam arrangement vector according to the gradient method.

At the time that the gradient of the function value of the evaluation function L(U) for evaluating the arrangement is inverted, a differential value dL/dU of the evaluation function L(U) is 0, and the function value of the evaluation function L(U) is thus largest.

FIG. 9, in which the vertical axis represents −L(U), illustrates that the function value of −L(U) is smallest at the time that the gradient of the evaluation function L(U) is inverted.

The arrangement vector U of i beams at the time that the function value of the evaluation function L(U) is largest is an arrangement vector $U_b$ representing the optimum arrangement.

FIG. 9 illustrates an example in which the initial value of the arrangement vector is $U_0$=[−0.7, 0.7], and search is started from the arrangement vector $U_0$=[−0.7, 0.7] and the function value of the evaluation function L(U) is largest at the arrangement vector $U_b$=[−1, 1].

Note that a and b in $U_b$=[a, b] are parameters representing the positions at which beams are arranged.

Upon reaching the arrangement vector $U_b$ representing the optimum arrangement of i beams, the evaluation value searching unit 33 outputs the arrangement vector $U_b$ to the comparing unit 34, and outputs an $SN_{max}(x, U_b)$ as the gain of the antenna 1 at the arrangement vector $U_b$ to the comparing unit 34.

The $SN_{max}(x, U_b)$ is the SN of the beam with the emitting direction closest to the azimuth angle x at which the target is assumed to be present in the arrangement vector $U_b$, and can be calculated using Expression (9) above.

Upon receiving the arrangement vector $U_b$ and $SN_{max}(x, U_b)$ from the evaluation value searching unit 33, the comparing unit 34 compares the $SN_{max}(x, U_b)$ with a preset reference value $SN_{base}$, and if the $SN_{max}(x, U_b)$ is larger than the reference value $SN_{base}$ (step ST12: YES in FIG. 8), determines the arrangement of beams represented by the arrangement vector $U_b$ to be the arrangement of beams to be emitted by the antenna 1, and outputs beam arrangement information indicating the arrangement of beams to the beam controlling unit 10.

If the $SN_{max}(x, U_b)$ is not larger than the reference value $SN_{base}$ (step ST12: NO), the comparing unit 34 outputs an instruction to increase the number of beams to the beam arrangement initializing unit 32.

However, in the case that the current number of beams has already reached a preset maximum number L, the comparing unit 34 cannot determine the arrangement of beams within the beam resource of the radar, and may terminate the processing without outputting an instruction to increase the number of beams to the beam arrangement initializing unit 32.

While the example in which the evaluation value searching unit 33 outputs an $SN_{max}(x, U_b)$ at the arrangement vector $U_b$ to the comparing unit 34 and the comparing unit 34 compares the $SN_{max}(x, U_b)$ with the reference value $SN_{base}$ is presented herein, the evaluation value searching unit 33 may output the target detection probability $P_d(x, U_b)$ at the arrangement vector $U_b$ to the comparing unit 34 and the comparing unit 34 may compare the detection probability $P_d(x, U_b)$ of the target with a preset reference value $P_{dbase}$. The reference value $P_{dbase}$ may be a minimum value of the desired detection probability.

In the case that the detection probability $P_d(x, U_b)$ of the target is compared with the reference value $P_{base}$, if the target detection probability $P_d(x, U_b)$ is larger than the reference value $P_{base}$, the comparing unit 34 determines the arrangement of beams represented by the arrangement vector $U_b$ to be the arrangement of beams to be emitted by the antenna 1 and outputs beam arrangement information indicating the arrangement of beams to the beam controlling unit 10.

If the target detection probability $P_d(x, U_b)$ is not larger than the reference value $P_{base}$, the comparing unit 34 outputs an instruction to increase the number of beams to the beam arrangement initializing unit 32.

As is clear from the description above, according to Third Embodiment, the beam arrangement determining unit 12 includes the beam arrangement determination processing unit 31 for increasing the number of beams to be emitted by the antenna 1 and determining the arrangement of the increased number of beams by using the direction information and the observation accuracy information acquired by the information acquiring unit 8, and the comparing unit 34 for determining the arrangement of beams determined by the beam arrangement determination processing unit 31 to be the arrangement of beams to be emitted by the antenna 1 in the case that the detection probability of the target or the gain of the antenna 1 at the beam arrangement determined by the beam arrangement determination processing unit 31 is larger than the reference value, which produces an effect of reducing the beam resource in addition to the effects of increasing the detection probability of the target and extending the search distance of the target similarly to First Embodiment.

In addition, since the evaluation function L(U) need not be calculated for each of the beam arrangement candidates U unlike First Embodiment, an effect of reducing the calculation load as compared to First Embodiment is also produced.

Note that embodiments of the present disclosure can be freely combined, any components in the embodiments can be modified, and any components in the embodiments can be omitted within the scope of the invention.

INDUSTRIAL APPLICABILITY

The present disclosure may be utilized for a radar and beam control method for increasing the target detection probability and extending the target search distance.

REFERENCE SIGNS LIST

1: antenna, 2: transmitting unit, 2a: transmitter, 2b: variable gain amplifier, 2c: phase shifter, 3: receiving unit, 3a: receiver, 3b: A/D converter, 4: digital signal processor, 5: signal processing unit, 6: information processing unit, 7: display processing unit, 8: information acquiring unit, 9: beam arrangement determining unit, 10: beam controlling unit, 11: display, 12: beam arrangement determining unit, 21: signal processing circuit, 22: information processing circuit, 23: display processing circuit, 24: information acquisition processing circuit, 25: arrangement determination processing circuit, 26: beam control processing circuit, 31: beam arrangement determination processing unit, 32: beam arrangement initializing unit, 33: evaluation value searching unit, 34: comparing unit, 51: memory, 52: processor

The invention claimed is:

1. A radar comprising:
   an antenna for emitting beams of electromagnetic waves into space in which a target is present, and receiving electromagnetic waves that are reflected from the target and return to the antenna;
   a signal processor to perform signal processing to detect the target from the electromagnetic waves received by the antenna;
   an information acquirer to acquire direction information indicating a direction in which the target is to be searched for and observation accuracy information indicating observation accuracy in the direction;
   a beam arrangement determiner to determine an arrangement of beams to be emitted by the antenna from the direction information and the observation accuracy information acquired by the information acquirer; and
   a beam controller to control directions of the beams to be emitted by the antenna in accordance with the arrangement of beams determined by the beam arrangement determiner,
   wherein the beam arrangement determiner:
      calculates a presence probability of the target from the direction information and the observation accuracy information acquired by the information acquirer,
      calculates a detection probability of the target from an antenna pattern of the antenna for each of beam arrangement candidates each representing an arrangement candidate for the beams,
      averages the detection probability of the target in each of the beam arrangement candidates with the presence probability of the target, selects a beam arrangement candidate having a relatively high averaged detection probability of the target from among the beam arrangement candidates, and determines the selected beam arrangement candidate to be an arrangement of the beams to be emitted by the antenna.

2. The radar according to claim 1, wherein
   the beam arrangement determiner performs tracking of the direction in which the target is to be searched for by using time-series direction information, the time-series direction information being obtained as a result of the beam arrangement determiner accumulating the direction information acquired by the information acquirer, the tracking being performed so as to reduce error in the direction in which the target is to be searched for, and
   the beam arrangement determiner determines the detection probability of the target from the direction information indicating the tracked direction and the observation accuracy information indicating observation accuracy in the tracked direction.

3. The radar according to claim 1, wherein
   the beam arrangement determiner performs tracking of the direction in which the target is to be searched for by using time-series direction information, the time-series direction information being obtained as a result of the beam arrangement determiner accumulating the direction information acquired by the information acquirer, the tracking being performed so as to reduce error in the direction in which the target is to be searched for, and the beam arrangement determiner uses an error distribution of the tracked direction as the presence probability of the target.

4. The radar according to claim 1, wherein the beam arrangement determiner calculates, as the detection probability of the target, a detection probability according to an interbeam correlation technique in which the target is assumed to be detected if a plurality of beams are emitted by the antenna and if one or more or N or more target signals are detected, N being an integer not smaller than 2.

5. A radar comprising:
an antenna for emitting beams of electromagnetic waves into space in which a target is present, and receiving electromagnetic waves that are reflected from the target and return to the antenna;
a signal processor to perform signal processing to detect the target from the electromagnetic waves received by the antenna;
an information acquirer to acquire direction information indicating a direction in which the target is to be searched for and observation accuracy information indicating observation accuracy in the direction;
a beam arrangement determiner to determine an arrangement of beams to be emitted by the antenna from the direction information and the observation accuracy information acquired by the information acquirer; and
a beam controller to control directions of the beams to be emitted by the antenna in accordance with the arrangement of beams determined by the beam arrangement determiner,
wherein the beam arrangement determiner:
calculates a presence probability of the target from the direction information and the observation accuracy information acquired by the information acquirer, and calculates a gain of the antenna from an antenna pattern of the antenna for each of beam arrangement candidates each representing an arrangement candidate for the beams,
averages the gain of the antenna in each of the beam arrangement candidates with the presence probability of the target, selects a beam arrangement candidate having a relatively high averaged gain of the antenna from among the beam arrangement candidates, and determines the selected beam arrangement candidate to be an arrangement of the beams to be emitted by the antenna.

6. A radar comprising:
an antenna for emitting beams of electromagnetic waves into space in which a target is present, and receiving electromagnetic waves that are reflected from the target and return to the antenna;
a signal processor to perform signal processing to detect the target from the electromagnetic waves received by the antenna;
an information acquirer to acquire direction information indicating a direction in which the target is to be searched for and observation accuracy information indicating observation accuracy in the direction;
a beam arrangement determiner to determine an arrangement of beams to be emitted by the antenna from the direction information and the observation accuracy information acquired by the information acquirer; and
a beam controller to control directions of the beams to be emitted by the antenna in accordance with the arrangement of beams determined by the beam arrangement determiner, wherein
the beam arrangement determiner includes:
a beam arrangement determination processor to increase the number of beams to be emitted by the antenna and determine an arrangement of the increased number of beams by using the direction information and the observation accuracy information acquired by the information acquirer, and
a comparator to determine the arrangement of beams determined by the beam arrangement determination processor to be the arrangement of beams to be emitted by the antenna if the detection probability of the target or the gain of the antenna at the arrangement of beams determined by the beam arrangement determination processor is larger than a reference value, and
the beam arrangement determination processor calculates a function value of an evaluation function for evaluating the arrangement of the increased number of beams, calculates a gradient of the function value, and outputs, to the comparator, an arrangement of beams associated with the function value at the time that a sign of the gradient is inverted, and
the comparator determines the arrangement of beams output from the beam arrangement determination processor to be the arrangement of beams to be emitted by the antenna if the detection probability of the target or the gain of the antenna at the arrangement of beams output from the beam arrangement determination processor is larger than a reference value.

* * * * *